(12) United States Patent
Mroueh et al.

(10) Patent No.: US 10,860,900 B2
(45) Date of Patent: Dec. 8, 2020

(54) TRANSFORMING SOURCE DISTRIBUTION TO TARGET DISTRIBUTION USING SOBOLEV DESCENT

(71) Applicant: International Business Machines Corporation, Armonk, NY (US)

(72) Inventors: Youssef Mroueh, New York, NY (US); Tom Sercu, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

(21) Appl. No.: 16/174,622

(22) Filed: Oct. 30, 2018

(65) Prior Publication Data
US 2020/0134399 A1    Apr. 30, 2020

(51) Int. Cl.
G06K 9/62    (2006.01)
G06N 3/04    (2006.01)

(52) U.S. Cl.
CPC ......... *G06K 9/6298* (2013.01); *G06K 9/6262* (2013.01); *G06N 3/04* (2013.01)

(58) Field of Classification Search
CPC .. G06K 9/6298; G06K 9/6262; G06K 9/6232; G06N 3/04
See application file for complete search history.

(56) References Cited

U.S. PATENT DOCUMENTS

| | | |
|---|---|---|
| 8,108,328 B2 | 1/2012 | Hench |
| 8,447,135 B2 | 5/2013 | Tai et al. |
| 9,665,792 B2 | 5/2017 | Xu et al. |

(Continued)

FOREIGN PATENT DOCUMENTS

| | | |
|---|---|---|
| CN | 105224504 | 1/2016 |
| CN | 107784361 | 3/2018 |

OTHER PUBLICATIONS

Mroueh et al., "Sobolev GAN", arXiv:1711.04894v1 [cs.LG], Nov. 14, 2017, 34 pages.

(Continued)

*Primary Examiner* — Lewis G West
(74) *Attorney, Agent, or Firm* — Amin, Turocy & Watson, LLP

(57) ABSTRACT

Systems, computer-implemented methods, and computer program products for transforming a source distribution to a target distribution. A system can comprise a memory that stores computer executable components and a processor that executes the computer executable components stored in the memory. The computer executable components can comprise a sampling component that receives a source distribution having a source sample and a target distribution having a target sample. The computer executable components can further comprise an optimizer component that employs a neural network to find a critic that dynamically discriminates between the source sample and the target sample, while constraining a gradient of the neural network. The computer executable components can further comprise a morphing component that generates a first product distribution by morphing the source distribution along the gradient of the neural network to the target distribution.

25 Claims, 10 Drawing Sheets
(2 of 10 Drawing Sheet(s) Filed in Color)

(56) References Cited

U.S. PATENT DOCUMENTS

| | | | |
|---|---|---|---|
| 2004/0222993 A1* | 11/2004 | Kaasa | G09B 23/04 345/474 |
| 2013/0124160 A1* | 5/2013 | Joshi | G06F 17/11 703/2 |
| 2014/0198106 A1* | 7/2014 | Sumner | G06T 13/40 345/473 |
| 2014/0198107 A1* | 7/2014 | Thomaszewski | G06T 13/40 345/473 |
| 2015/0312663 A1* | 10/2015 | Traa | G10L 21/0308 381/92 |
| 2016/0321522 A1 | 11/2016 | Yuan et al. | |
| 2017/0139204 A1* | 5/2017 | Pauly | G01N 21/4133 |
| 2018/0025257 A1* | 1/2018 | van den Oord | G06K 9/4652 375/240.14 |
| 2018/0032836 A1 | 2/2018 | Hurter | |
| 2018/0204111 A1* | 7/2018 | Zadeh | G06K 9/00281 |
| 2019/0130213 A1* | 5/2019 | Shazeer | G06T 3/4053 |
| 2019/0172184 A1* | 6/2019 | Pan | G06T 5/006 |
| 2019/0355155 A1* | 11/2019 | Shugrina | G06T 15/503 |
| 2020/0134442 A1* | 4/2020 | Sim | G06N 3/08 |

OTHER PUBLICATIONS

Pfau et al., "Connecting Generative Adversarial Networks and Actor-CriticMethods", arXiv:1610.01945v3 [cs.LG], Jan. 18, 2017, 10 pages.

Anonymous, "Sobolev Descent: Variational Transport of Distributions via Advection", 17 pages.

Benamou et al., "A computational fluid mechanics solution to the Monge-Kantorovich mass transfer problem", Numer. Math. 84, 2000, pp. 375-393, 19 pages.

Villani, "Optimal transport, old and new", Grundlehren der mathematischen Wissenschaften, Jun. 13, 2008, 1000 pages.

Castro et al., "Shape Morphing of Complex Geometries Using Partial Differential Equations", Journal of Multimedia, vol. 2, No. 6, Nov. 2007, pp. 15-25, 11 pages.

Liu et al., "Stein Variational Gradient Descent: A General Purpose Bayesian Inference Algorithm", 30th Conference on Neural Information Processing Systems, 2016, 9 pages.

Peyre et al., "Computational Optimal Transport", arXiv:1803.00567v1 [stat.ML], Mar. 1, 2018, 200 pages.

\* cited by examiner

TRANSFORMING SOURCE DISTRIBUTION TO TARGET DISTRIBUTION USING SOBOLEV DESCENT

BACKGROUND

The subject disclosure relates to machine learning systems, and more specifically to transforming source distribution to target distribution using Sobolev Descent.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate transporting source distribution to target distribution using Neural Sobolev Descent.

According to an embodiment, a system can comprise a memory that stores computer executable components and a processor that executes the computer executable components stored in the memory. The computer executable components can comprise a sampling component that receives a source distribution having a source sample, and a target distribution having a target sample. The computer executable components can further comprise an optimizer component that employs a neural network to find a critic that dynamically discriminates between the source sample and the target sample, while constraining a gradient of the neural network. The computer executable components can further comprise a morphing component that generates a first product distribution by morphing the source distribution along the gradient of the neural network to the target distribution.

According to another embodiment, a computer-implemented method can comprise receiving, by a system operatively coupled to a processor, a source distribution having a source sample, and a target distribution having a target sample. The computer-implemented method can comprise, employing, by the system operatively coupled to the processor, a neural network to find a critic that dynamically discriminates between the source sample and the target sample, while constraining a gradient of the neural network. The computer-implemented method can comprise, generating, by the system operatively coupled to the processor, a first product distribution by morphing the source distribution along the gradient of the neural network to the target distribution.

According to yet another embodiment, a computer program product that can facilitate transforming a source distribution to a target distribution using Sobolev Descent. The computer program product can comprise a computer readable storage medium having program instructions embodied therewith, the program instructions can be executable by a processor to cause the processor to receive, by the processor, the source distribution having a source sample and the target distribution having a target sample. The program instructions can further cause the processing component to employ, by the processor, a neural network to find a critic that dynamically discriminates between the source sample and the target sample, while constraining a gradient of the neural network. The program instructions can further cause the processing component to generate, by the processor, a first product distribution by morphing the source distribution along the gradient of the neural network to the target distribution.

According to another embodiment, a system can comprise a memory that stores computer executable components and a processor that executes the computer executable components stored in the memory. The computer executable components can comprise a sampling component that receives a source distribution having a source sample, and a target distribution having a target sample. The computer executable components can further comprise an optimizer component that optimizes a neural network, wherein the optimizer component: determines a critic that dynamically discriminates between the source sample and the target sample, iteratively optimizes the critic, and updates one or more parameters of the critic. The computer executable components can further comprise a morphing component that iteratively transports particles of the source distribution along a gradient of the target distribution to create a product distribution, wherein the product distribution is stored in the memory.

According to another embodiment, a computer-implemented method can comprise receiving, by a sampling component operatively coupled to a processor, a source distribution having a source sample and a target distribution having a target sample. The computer-implemented method can comprise, optimizing, by an optimizer component operatively coupled to the processor, a neural network, wherein optimizing comprises: determining a critic that dynamically discriminates between the source sample and the target sample, and iteratively updating the critic. The computer-implemented method can comprise, iteratively transporting, by a morphing component operatively coupled to the processor, one or more particles of the source distribution along a gradient of the target distribution to create a product distribution that is stored in a memory.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

According to several embodiments, a system is described that can be used to transform a source to a target using deep learning technology. The transformation is performed by generating one or more intermediate samples, which can be generated using a neural network that is optimized periodically to insure the particles of distributions move along the gradient descent. For example, morphing a first shape (e.g., source distribution) to and a second shape (e.g., target distribution) with a given color and shape requirements. Using the system described here is very useful in determining how the data/images were transformed. For example, if the source distribution was an image of tumor at starting point and the target distribution was tumor image of the tumor at six months later, doctors can use the system described herein to generate intermediate distributions to analyze how the tumor may have evolved in the six months.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1A:
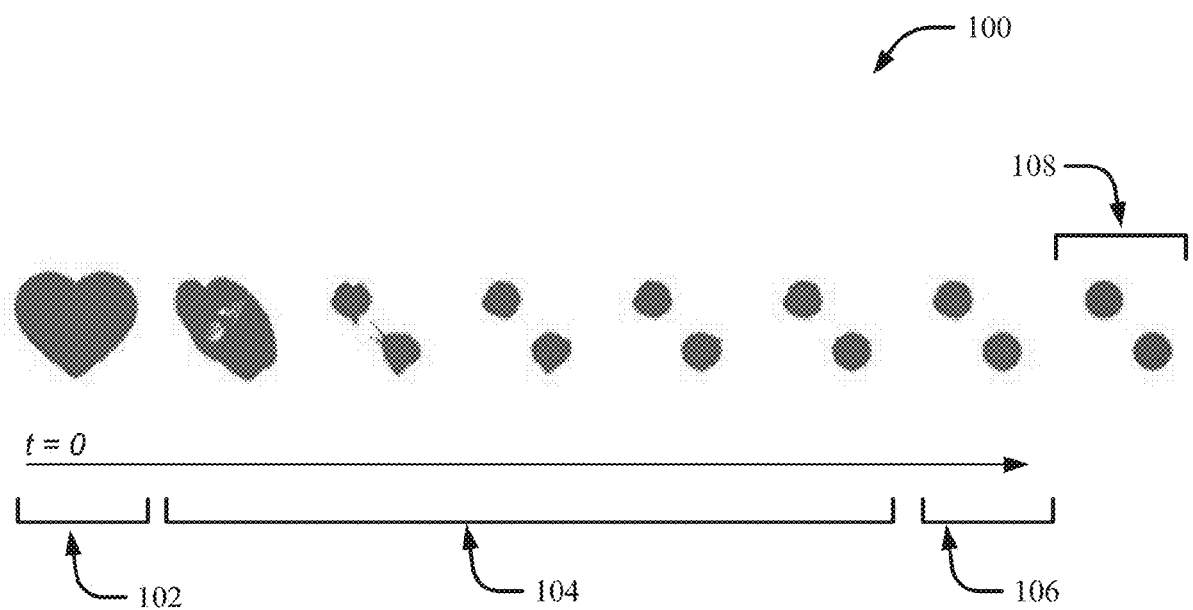
FIG. 1A illustrates an example, non-limiting set of images that depict shape transformation of a source image to a shape of target image in accordance with one or more embodiments described herein.

FIG. 1A illustrates an example, non-limiting a set of images 100 that illustrate shape transformation of a source image 102 to a shape of target image 108 in accordance with one or more embodiments described herein. As depicted, the source image 102 comprises a heart shape. The goal is to match the shape of source image 102 to the shape of target image 108 (e.g., transform shape distribution of heart to a shape distribution of two dots). The set of images 100 illustrate a transformation of a heart shape image 102 (e.g., source or starting image) to a desired two dots shape image 106 (e.g., final shape). The target image 108 (e.g., target shape) represents a desired shape used to morph the starting shape 102 (e.g., source image). In some examples, only the shape is transformed, and color remains the same as the source. Images 104 illustrate a set of intermediate images 104 that show progression towards the target image 108 and can be captured at various times during the transformation process.

Figure 1B:
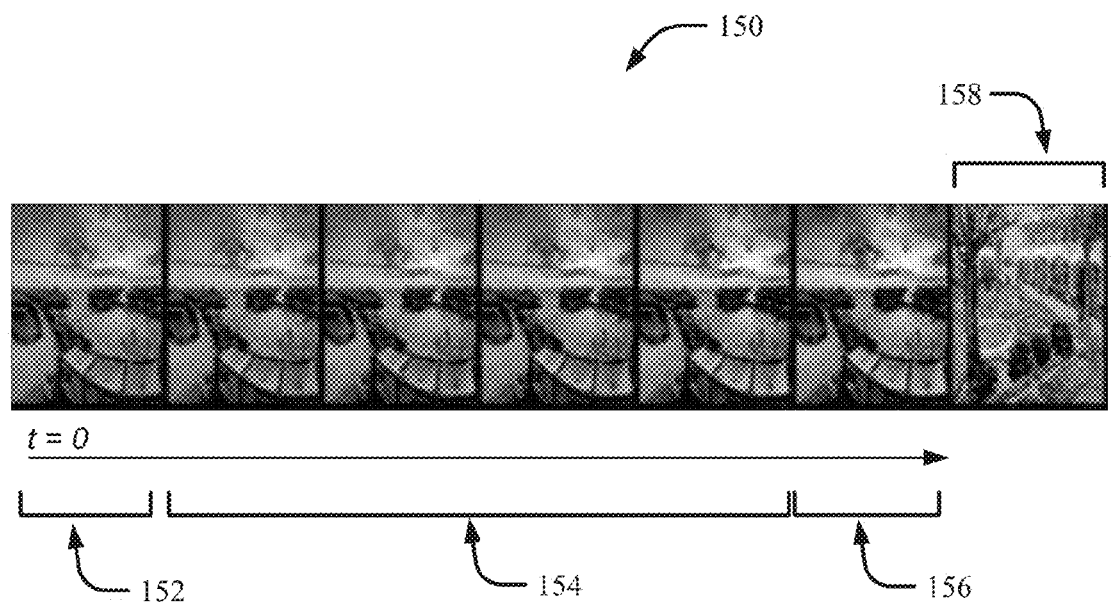
FIG. 1B illustrates an example, non-limiting set of images that show color transformation of a source image to a color of target image in accordance with one or more embodiments described herein.

FIG. 1B illustrates an example, non-limiting set of images 150 that illustrate a color transformation of a source image 152 to a color of target image 158 in accordance with one or more embodiments described herein. Repetitive description of like elements employed in respective embodiments is omitted for sake of brevity. According an embodiment, as depicted, the source image 152 comprises a source color distribution (e.g., initial color of the image). The goal is to match color distribution of the source image 152 to color distribution of the target image 158. The set of images 150 illustrate transformation from color of the source image 152 (e.g., source or starting color) to a final image 156 comprising colors of the target image 158. The target image 158 comprises desired color distribution that can be used to morph the source image 152 with color distribution of the target image 158. The images define the source and target distribution respectively, where each pixel is a sample in 3D color space. A Sobolev critic is estimated at every step in the transformation. The gradient of the critic specifies the direction in color space to move the pixel. Every timestep the color of each pixel in the source image is updated a small amount until it matches the color distribution of the target image. Images 154 illustrate a set of intermediate images 154 that show a path to the target image 158 and can be captured at various times during the transformation process.

Figure 2:
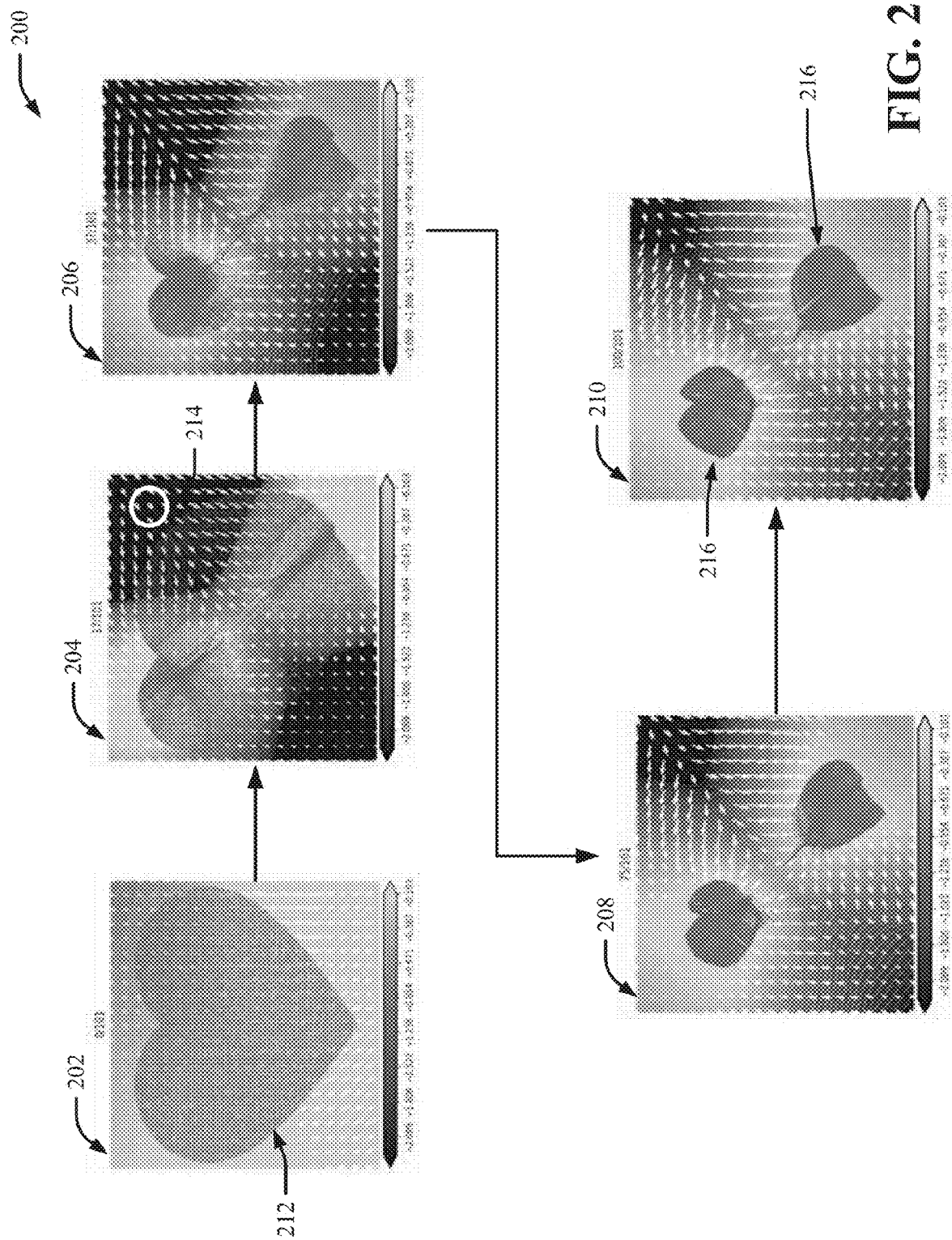
FIG. 2 illustrates an example, non-limiting set of images that show transformation of a source distribution to a target distribution in accordance with one or more embodiments described herein.

FIG. 2 illustrates an example, non-limiting set of images 200 that show transformation of a source distribution to a target distribution in accordance with one or more embodiments described herein. Repetitive description of like elements employed in respective embodiments is omitted for sake of brevity. According to an embodiment, images 202-210 illustrate images that were captured at various times during the transformation process. Image 202 illustrates the starting image (e.g., source distribution) with heart shape 212 that will be morphed to two dots 216. In some embodiments, a Neural. Sobolev Descent algorithm can be employed for transforming the source distribution (e.g., data/distribution for a shape or color of an image) to the target distribution to achieve a desired distribution (e.g., a final image or shape). A Sobolev Descent is a particles-based algorithm for transporting empirical probability distribution (e.g., transporting particles from a source distribution to a target distribution by following the gradient of the Sobolev discrepancy). A neural version of the Sobolev Decent (e.g., Neural Sobolev Descent) algorithm employs a neural network that can be continuously trained using updated data sets that allow dynamic transformation (e.g., series of steps that change in the direction of final solution). Image 206 illustrates distribution of image after applying the Neural Sobolev Descent for several iterations. The arrows at 214 show that red particles (e.g., pixels representing the heart) are moving along the gradient of the target distribution, the two dots 216. Image 208-210 illustrates distribution after continuous application of the Neural Sobolev Descent. As it can be seen, the red particles are getting concentrated as the particles move towards the target distribution. With continuous form of this descent, the distribution of the particles (e.g., pixels or data points) initialized with the source distribution asymptotically converges to the target distribution. The Neural Sobolev Descent allows particles of source distribution or modified distribution to move to a target distribution defined through empirical distribution (e.g., from samples).

Figure 3:
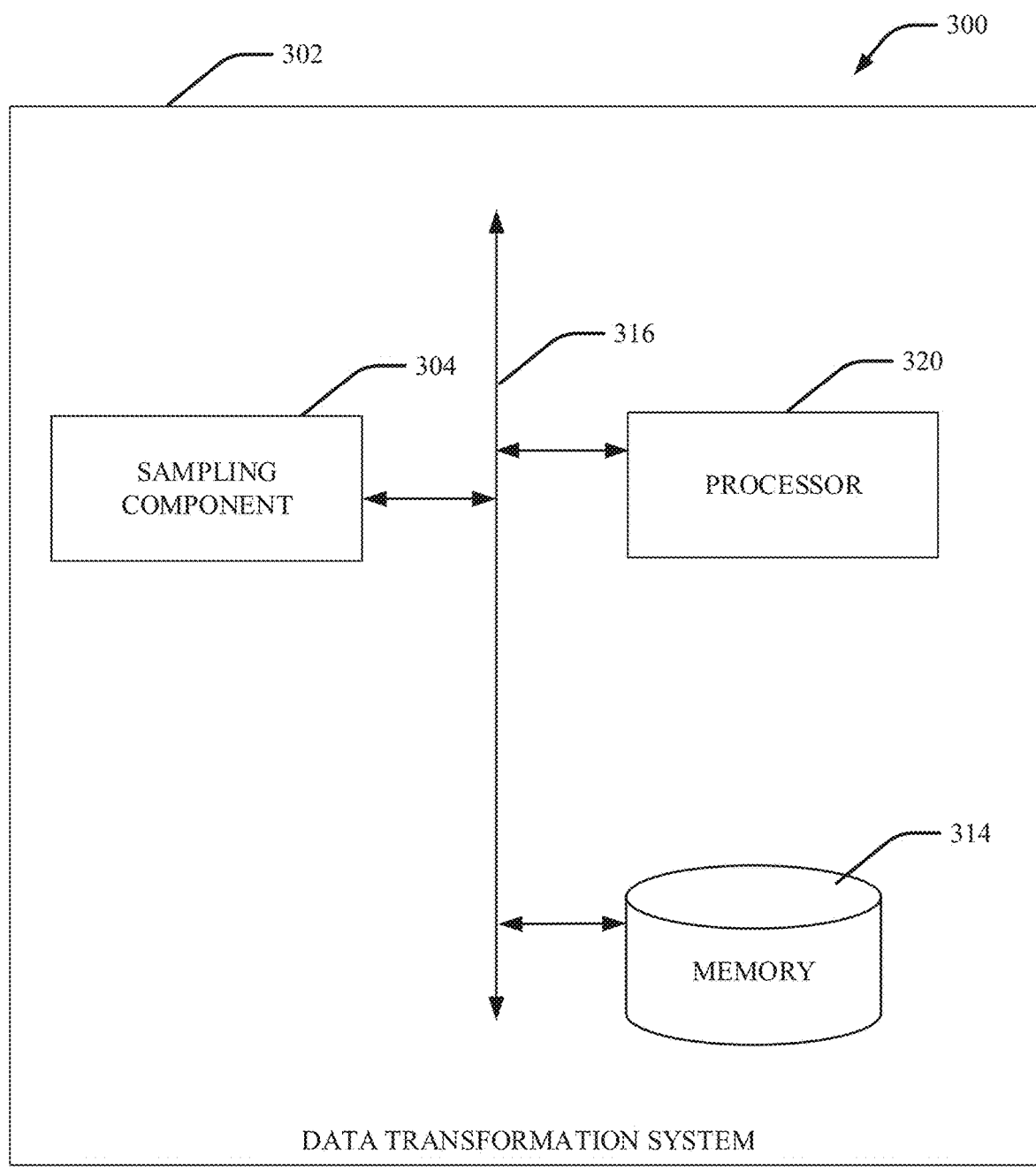
FIG. 3 illustrates a block diagram of an example, non-limiting computer implemented system that facilitates transforming a source distribution to a target distribution using Sobolev Descent algorithm in accordance with one or more embodiments described herein.

FIG. 3 illustrates a block diagram of an example, non-limiting computer implemented system 300 that facilitates transforming a source distribution to a target distribution using Sobolev Descent algorithm in accordance with one or more embodiments described herein. According to several embodiments, system 300 can optionally include a server device, one or more networks and one or more devices (not shown) and comprises a data transformation system 302. The data transformation system 302 can also include or otherwise be associated with at least one processor 320 that executes computer executable components stored in memory 314. The data transformation system 302 can further include a system bus 316 that can couple various components including, but not limited to, a sampling component 204.

Aspects of systems (e.g., system 300 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 300 and the sampling component 304 can further comprise various computer and/or computing-based elements described herein with reference to operating environment 1000 and FIG. 10. In several embodiments, such computer and/or computing-based elements can be used in connection with implementing one or more of the systems, devices, and/or components shown and described in connection with FIG. 3 or other figures disclosed herein.

According to several embodiments, memory 314 can store one or more computer and/or machine readable, writable, and/or executable components and/or instructions that, when executed by processor 320, can facilitate performance of operations defined by the executable component(s) and/or instruction(s). For example, memory 314 can store computer and/or machine readable, writable, and/or executable components and/or instructions that, when executed by processor 320, can facilitate execution of the various functions described herein relating to the sampling component 304.

In several embodiments, memory 314 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 314 are described below with reference to system memory 1016 and FIG. 10. Such examples of memory 314 can be employed to implement any embodiments of the subject disclosure.

According to some embodiments, processor 320 can comprise one or more types of processors and/or electronic circuitry that can implement one or more computer and/or machine readable, writable, and/or executable components and/or instructions that can be stored on memory 314. For example, processor 320 can perform various operations that can be specified by such computer and/or machine readable, writable, and/or executable components and/or instructions including, but not limited to, logic, control, input/output (I/O), arithmetic, and/or the like. In some embodiments, processor 320 can comprise one or more central processing unit, multi-core processor, microprocessor, dual microprocessors, microcontroller, System on a Chip (SOC), array processor, vector processor, and/or another type of processor.

In some embodiments, processor 320, memory 314 and sampling component 304 can be communicatively, electrically, and/or operatively coupled to one another via a bus 316 to perform functions of system 300, and/or any components coupled therewith. In several embodiments, bus 316 can comprise one or more memory bus, memory controller, peripheral bus, external bus, local bus, and/or another type of bus that can employ various bus architectures. Further examples of bus 316 are described below with reference to system bus 1018 and FIG. 10. Such examples of bus 316 can be employed to implement any embodiments of the subject disclosure.

In several embodiments, data transformation system 302 can comprise one or more computer and/or machine readable, writable, and/or executable components and/or instructions that, when executed by processor 320, can facilitate performance of operations defined by such component(s) and/or instruction(s). Further, in numerous embodiments, any component associated with data transformation system 302, as described herein with or without reference to the various figures of the subject disclosure, can comprise one or more computer and/or machine readable, writable, and/or executable components and/or instructions that, when executed by processor 320, can facilitate performance of operations defined by such component(s) and/or instruction(s). For example, sampling component 304, and/or any other components associated with data transformation system 302 (e.g., communicatively, electronically, and/or operatively coupled with and/or employed by data transformation system 302), can comprise such computer and/or machine readable, writable, and/or executable component(s) and/or instruction(s). Consequently, according to numerous embodiments, data transformation system 302 and/or any components associated therewith, can employ processor 320 to execute such computer and/or machine readable, writable, and/or executable component(s) and/or instruction(s) to facilitate performance of one or more operations described herein with reference to data transformation system 302 and/or any such components associated therewith.

In several embodiments, the sampling component 304 can receive input parameters for the Neural Sobolev Descent algorithm. In some embodiments, the sampling component 304 can receive target distribution (e.g., various data from the target, such as desired shape of an image or color distribution of an image) having a least one target sample, source distribution (e.g., various data from a source, such as a shape of an image or color distribution of an image) having at least one source sample. It should be noted that the Neural Sobolev Descent algorithm can be applied to any type of data distribution having a starting data set (e.g., source) and final data set (e.g., target). The use of the Neural Sobolev Descent algorithm is not limited to transformation of shapes or color of images. For example, the source data can be traffic data at time at t=0 and target data may comprise traffic data at t=x. As another example, the source data set can comprise an image of tumor at t=0 and target data set may comprise an image of tumor at t=x (e.g., image taken after 6 months or a year). In some embodiments, the Neural Sobolev Descent algorithm can be used to determine how the source distribution transitioned to the target distribution by storing intermediate images in memory. As discussed below, at various stages of transformation, data distribution can be stored in memory 314 for further analysis.

In several embodiments, the sampling component 304 can parameterize a neural network feature map to define the critic. Depending on the type of application, the neural network architecture is domain specific. For example, a convolution neural network can be employed for image applications. The neural network can comprise multi-layer perceptron for other data transformation applications. In some embodiments, the neural network can comprise a multi-layer perceptron having at least three layers. The last layer can be linear, and its weights/parameters can be adapted by the algorithm, whereas the neural network feature map can be fixed.

In several embodiments, the sampling component 304 can receive a source distribution having a source sample, and a target distribution having a target sample. In some embodiments, the entire distribution is not necessary to transform the content to target distribution. The data transformation system 302 can provide samples of distribution to the sampling component 204. Once the sampling component 204 receives the samples, the Neural Sobolev Descent algorithm parameters can be estimated using samples of the dataset, rather than needing a analytical mathematical expression of the full distribution where the data is sampled from.

Figure 4:
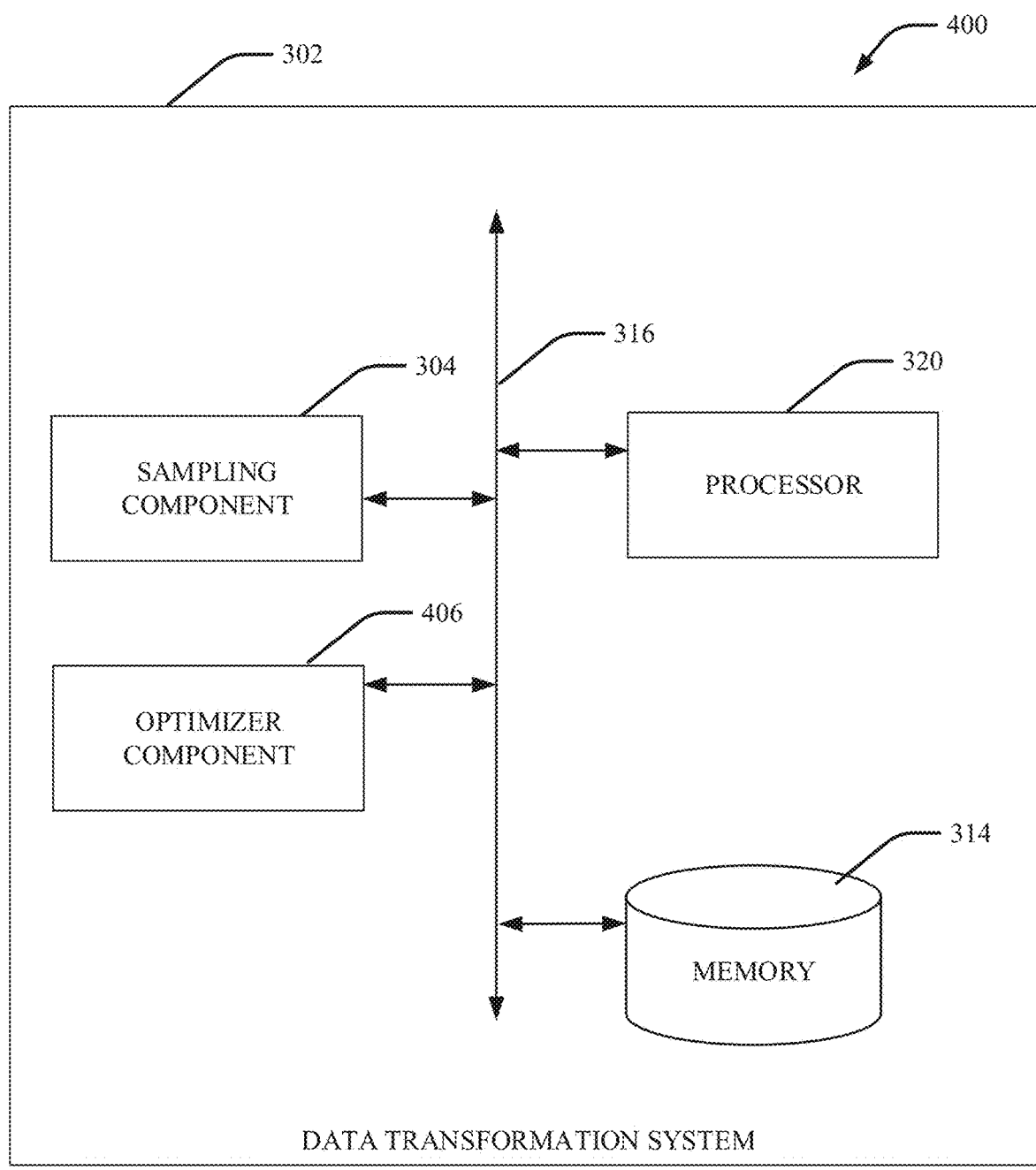
FIG. 4 illustrates a block diagram of an example, non-limiting computer implemented system that facilitates transforming a source distribution to a target distribution using Sobolev Descent algorithm in accordance with one or more embodiments described herein.

FIG. 4 illustrates a block diagram of an example, non-limiting computer implemented system 400 that facilitates transforming a source distribution to a target distribution using Sobolev Descent algorithm in accordance with one or more embodiments described herein. Repetitive description of like elements employed in respective embodiments is omitted for sake of brevity. According to several embodiments, system 400 can comprise data transformation system 302. In some embodiments, data transformation system 302 can comprise the optimizer component 406 that can be operatively coupled to components described in FIG. 3.

In some embodiments, the optimizer component 406 can employ a neural network to find a critic that dynamically discriminates between the source sample and the target sample, while constraining the gradient of the neural network on the source samples. This can be done by auto-differentiation algorithms which can calculate the norm of the gradient, then add it to the objective function of the critic. The gradient can be constrained with an augmented Lagrange method which consists of a squared penalty of the gradient norm together with an adaptive multiplier.

In some embodiments the optimizer component 406 can identify a critic (e.g., a measuring function that indicates how the algorithm is converging to the target distribution) using the function's objectives. The optimizer component 406 can iteratively update a critic several times during the transformation of data. In some embodiments, the critic is a function, parametrized by a neural network or in a kernel space, that maximizes the mean discrepancy between probability measures of two distributions (e.g., source distribution and target distribution or current and target distribution). The critic provides guidance as to where the current distribution is with respect to the target distribution. In some embodiments, the critic is determined using samples from the source distribution and samples from the target distribution. For example if the source and the target distributions are in the image domain, the critic could be a convolutional neural network function. It would process the images from the two distributions in a hierarchical convolutional way, to determine the distance between the distributions as well as the guidance of the direction in which to move the color of each of the pixels.

In some embodiments, the optimizer component 406 can iteratively optimize a neural network (e.g., training neural network with updated critic) as the source distribution is transported towards (e.g., moves towards) the target distribution. In some embodiments, a neural network with defined objectives is employed to find a critic that dynamically discriminates between the source sample and the target sample. In some embodiments, the neural network objectives are defined as the sum of the function over target distribution minus the sum of the function over source distribution provides the objective for neural network.

In some embodiments, the optimizer component 406 can optimize the parameters of the critic via stochastic gradient descent combined with augmented Lagrangian method. Using the augmented Lagrangian method, the gradient of the neural network is constrained. Using this approach, the gradient of neural network with respect to its parameters and gradient with respect to the input is determined. The norm of the gradient with respect to the input is computed and will then be added to the critic objective with the augmented Lagrangian method. The critic objective now consists of two parts: the main objective to tell apart the two distributions, and the second part (the Lagrangian) to constrain the gradient norm. This objective will be used to determine the gradient of the parameters at every timestep. With this gradient, the neural network is optimized using stochastic gradient descent.

In several embodiments, the optimizer component 406 can employ principles of machine learning and/or artificial intelligence to train a predictive model (e.g., a machine learning model, a machine learning algorithm, a neural network, etc.) to identify the objectives and the critic. In several embodiments, the optimizer component 406 can employ any suitable machine learning based techniques, statistical-based techniques, and/or probabilistic-based techniques to train and re-train the neural network and updating the critic. In several embodiments, the optimizer component 406 can leverage advances in deep learning, for example architectural inductive biases or domain-specific knowledge using a specific neural network architecture (e.g. convolutional neural network for images).

Figure 5:
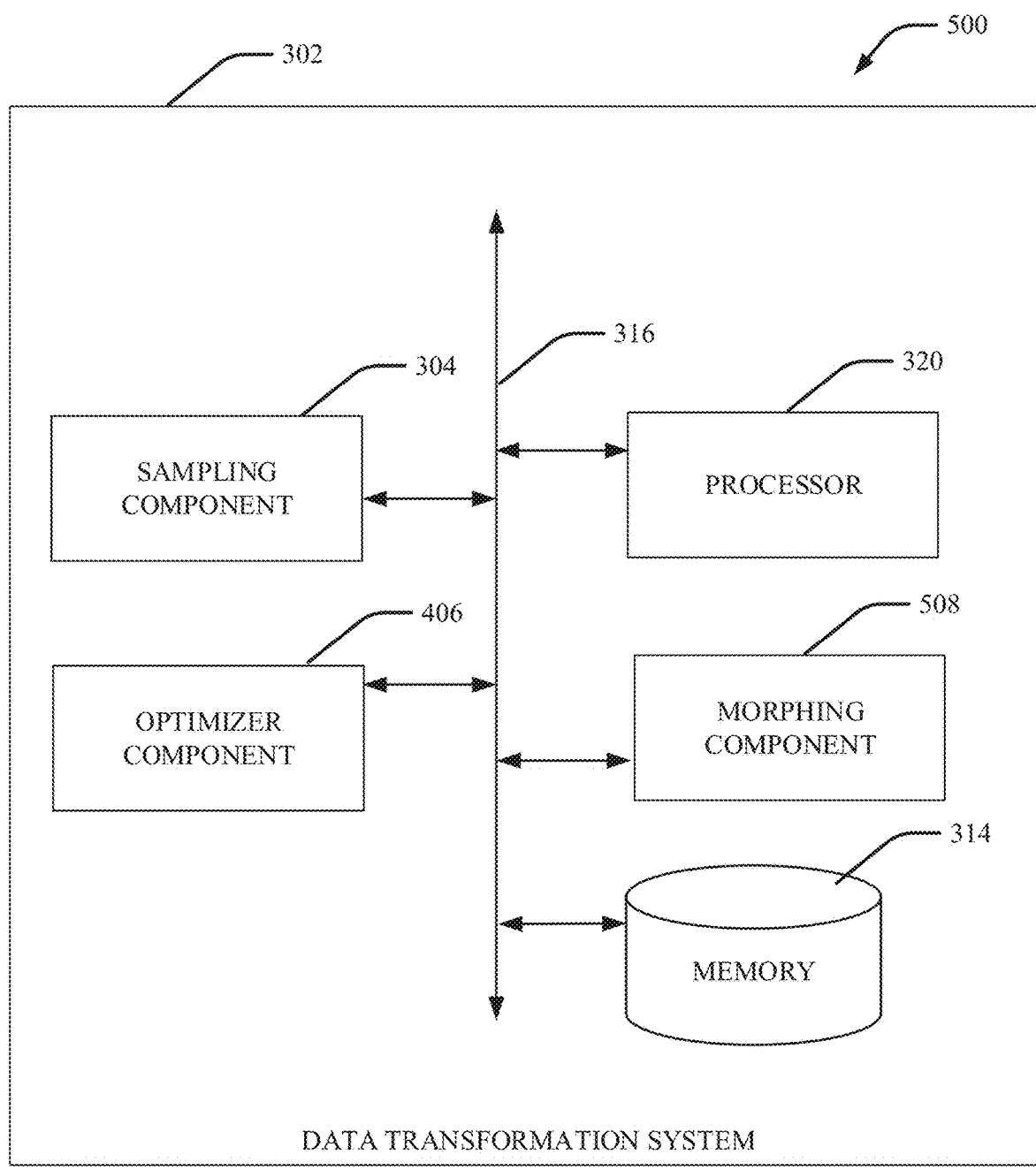
FIG. 5 illustrates a block diagram of an example, non-limiting computer implemented system 500 that facilitates transforming a source distribution to a target distribution using Sobolev Descent algorithm in accordance with one or more embodiments described herein.

FIG. 5 illustrates a block diagram of an example, non-limiting computer implemented system 500 that facilitates transforming a source distribution to a target distribution using Sobolev Descent algorithm in accordance with one or more embodiments described herein. Repetitive description of like elements employed in respective embodiments is omitted for sake of brevity. According to several embodiments, system 500 can comprise data transformation system 302. In some embodiments, data transformation system 302 can comprise the morphing component 508 that can be operatively coupled to components described in FIG. 4.

In some embodiments, the morphing component 508 can generate an updated distribution (e.g., first product distribution), which is a product of morphing the source distribution (or previous/current distribution) along the gradient of the neural network to the target distribution. In some embodiments, morphing component can generate/capture an intermediate distribution each time the updated distribution is generated (e.g., as shown, in FIG. 1A-B and FIG. 2, the intermediate images represent the updated distribution). In some embodiments, after optimizer component 406 has optimized the neural network for several iterations (e.g., 10 iterations), the morphing component 508 moves the particles with gradient of the neural network, thereby replacing the source distribution with updated distribution that is closer to the target distribution. The optimizer component 406 can replace the previous distribution and can use the updated distribution for future optimization. It should be noted that the gradient gets smaller after each particle update until the update distribution equals to target distribution.

In some embodiments, the morphing component 508 can generate a first product distribution by morphing the source distribution along the gradient of the neural network to the target distribution. In some embodiments, the morphing component can iteratively transport particles of the source distribution along a gradient of the target distribution to create a product distribution and store the product distribution in memory 314.

According to multiple embodiments, data transformation system 302 can facilitate performance of operations related to and/or executed by a sampling component 304 (FIG. 3), an optimizer component 406 (FIG. 4) and a morphing component 508 (FIG. 5). For example, as described in detail below, receiving, (e.g., via the sampling component 304) a source distribution having a source sample, and a target distribution having a target sample; employing, (e.g., via the optimizer component 406) a neural network to find a critic that dynamically discriminates between the source sample and the target sample, while constraining a gradient of the neural network; and generating, (e.g., the morphing component 508) a first product distribution by morphing the source distribution along the gradient of the neural network to the target distribution.

According to some embodiments, data transformation system 302 can facilitate performance of operations related to and/or executed by a sampling component 304 (FIG. 3), an optimizer component 406 (FIG. 4) and a morphing component 508 (FIG. 5). For example, as described in detail below, receiving, (e.g., via the sampling component 304) a source distribution having a source sample, and a target distribution having a target sample; determining, (e.g., via the optimizer component 406) a critic that dynamically discriminates between the source sample and the target sample, iteratively optimizes the critic; and updates one or more parameters of the critic; and iteratively transporting, (e.g., the morphing component 508) particles of the source distribution along the gradient of the target distribution to create a product distribution, wherein the product distribution is stored in a memory.

It should be appreciated that the embodiments of the subject disclosure depicted in various figures disclosed herein are for illustration only, and as such, the architecture of such embodiments are not limited to the systems, devices, and/or components depicted therein. For example, in some embodiments, data transformation system 302, the sampling component 304, the optimizer component 406 and the morphing component 508 can further comprise various computer and/or computing-based elements described herein with reference to operating environment 1000 and FIG. 10. In several embodiments, such computer and/or computing-based elements can be used in connection with implementing one or more of the systems, devices, and/or components shown and described in connection with FIG. 5 or other figures disclosed herein.

The data transformation system 302 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the data transformation system 302 and/or any other suitable device that can employ information provided by system 300. It is to be appreciated that the data transformation system 302, components, models or devices can be equipped with communication components (not shown) that enable communication between the system, components, models, devices, etc. over one or more networks.

According to several embodiments, memory 314 can store one or more computer and/or machine readable, writable, and/or executable components and/or instructions that, when executed by processor 320, can facilitate performance of operations defined by the executable component(s) and/or instruction(s). For example, memory 314 can store computer and/or machine readable, writable, and/or executable components and/or instructions that, when executed by processor 320, can facilitate execution of the various functions described herein relating to sampling component 304, optimizer component 406 and a morphing component 508.

According to some embodiments, the data transformation system 302 can employ the following Neural Sobolev Descent algorithm for facilitating transformation of source distribution to target distribution using Sobolev Descent technique in accordance with one or more embodiments described herein. The algorithm describes the optimization of the neural critic ("Critic Update"), parametrized with a neural network (for example a convolutional neural network for images, or a multi-layer perceptron for shape morphing). It also describes the "Particles Update" which morphs source to target distribution.

Inputs: $\varepsilon$ Learning rate particles, $n_c$ number of critics updates, T number of iterations
$\{x_i, i = 1 \ldots N\}$, drawn from target distribution $v_p$
$\{y_j, j = 1 \ldots M\}$ drawn from source distribution $v_q$
Neural critic $f_\xi(x) = (v, \Phi_w(x))$, $\xi = (v,w)$ parameters of the neural network
Initialize $x_j^0 = y_j$, $j = 1 \ldots M$
for $\ell = 1 \ldots T$ do
  Critic Update
  (between particles updates gradient descent on the critic is initialized from previous episodes)
  for $j = 1$ to $n_c$ do $$\hat{\mathscr{E}}(\xi) \leftarrow \frac{1}{N}\sum_{i=1}^{N} f_\xi(x_i) - \frac{1}{M}\sum_{j=1}^{M} f_\xi(x_j^{\ell-1})$$

$$\hat{\Omega}(\xi) \leftarrow \frac{1}{M}\sum_{j} \|\nabla_x f_\xi(x_j^{\ell-1})\|^2$$

$$\mathcal{L}_S(\xi, \lambda) = \hat{\mathscr{E}}(\xi) + \lambda(1 - \hat{\Omega}(\xi)) - \frac{\rho}{2}(\hat{\Omega}(\xi) - 1)^2$$

$(g_\xi, g_\lambda) \leftarrow (\nabla_\xi \mathcal{L}_S, \nabla_\lambda \mathcal{L}_S)(\xi, \lambda)$
    $\xi \leftarrow \xi + \eta \text{ ADAM }(\xi, g_\xi)$
    $\lambda \leftarrow \lambda - \rho g_\lambda$ {SGD rule on $\lambda$ with learning rate $\rho$}
  end for
  Particles Update
  for $j = 1$ to M do

```
    x_j^ℓ = x_j^{ℓ-1} + ε∇_x f_ξ(x_j^{ℓ-1}) (current f_ξ is the critic
           between q_{ℓ-1} and p)
    end for
  end for
  Output: {x_j^T, j = 1 ... M}
```

In the above exemplary Neural Sobolev Descent, the critic function is estimated using a neural network $f_ξ(x) = \langle v, Φ_w(x) \rangle$ wherein $ξ=(v, w)$ are the parameters of the neural network that are learned by gradient descent. The parameters of the critic are optimized via augmented Lagrangian maximization. The following is used to iteratively train and re-train the neural network:

```
Critic Update
(between particles updates gradient descent on the
critic is initialized from previous episodes)
for j = 1 to n_c do
```

$$\hat{\mathscr{E}}(ξ) ← \frac{1}{N}\sum_{i=1}^{N} f_ξ(x_i) - \frac{1}{M}\sum_{j=1}^{M} f_ξ(x_j^{ℓ-1})$$

$$\hat{Ω}(ξ) ← \frac{1}{M}\sum_j \|∇_x f_ξ(x_j^{ℓ-1})\|^2$$

$$\mathcal{L}_S(ξ, λ) = \hat{\mathscr{E}}(ξ) + λ(1 - \hat{Ω}(ξ)) - \frac{ρ}{2}(\hat{Ω}(ξ) - 1)^2$$

$(g_ξ, g_λ) ← (∇_ξ \mathcal{L}_S, ∇_λ \mathcal{L}_S)(ξ, λ)$
$ξ ← ξ + η \text{ ADAM}(ξ, g_ξ)$
$λ ← λ - ρg_λ$ {SGD rule on λ with learning rate ρ}

In some embodiments, the following part is the main objective which discriminates maximally between samples from the source and the targets distribution:

$$\hat{\mathscr{E}}(ξ) ← \frac{1}{N}\sum_{i=1}^{N} f_ξ(x_i) - \frac{1}{M}\sum_{j=1}^{M} f_ξ(x_j^{ℓ-1})$$

In some embodiments, the following part is the gradient norm, computed on the samples from the source distribution:

$$\hat{Ω}(ξ) ← \frac{1}{M}\sum_j \|∇_x f_ξ(x_j^{ℓ-1})\|^2$$

In some embodiments, the following part is the augmented Lagrange multiplier added to the main objective function to construct the loss:

$L_S(ξ,λ) = \hat{\mathscr{E}}(ξ) + λ(1 - \hat{Ω}(ξ)) - ρ/2(\hat{Ω}(ξ) - 1)^2$

In some embodiments, this is the gradient computation and stochastic update of the critic neural network parameters and Lagrange multiplier respectively:

$(g_ξ, g_λ) ← (∇_ξ L_S, ∇_λ L_S)(ξ, λ)$ $ξ ← ξ + ηADAM(ξ, g_ξ)$ $λ ← λ - ρg_λ$ {SGD rule on λ with learning rate ρ}

In some embodiment, the following algorithm is employed for moving the particles with gradient of the neural network, thereby replacing the source distribution (or previous distribution) with updated distribution that is closer to the target distribution.

Particles Update
for j=1 to M do
  $x_j^ℓ = x_j^{ℓ-1} + ε∇_x f_ξ(x_j^{ℓ-1})$ (current f_ξ is the critic between $q_{ℓ-1}$ and p)
end for In some embodiments, data transformation system 302 can employ hardware and/or software to solve problems that are highly technical in nature, that are not abstract and that cannot be performed as a set of mental acts by a human. It is to be appreciated that data transformation system 302 can perform a data morphing process utilizing various combinations of electrical components, mechanical components, and circuitry that cannot be replicated in the mind of a human or performed by a human. For example, moving the particles with gradient of the neural network, thereby replacing the source distribution (or previous distribution) with updated distribution that is closer to the target distribution.

Figure 6:
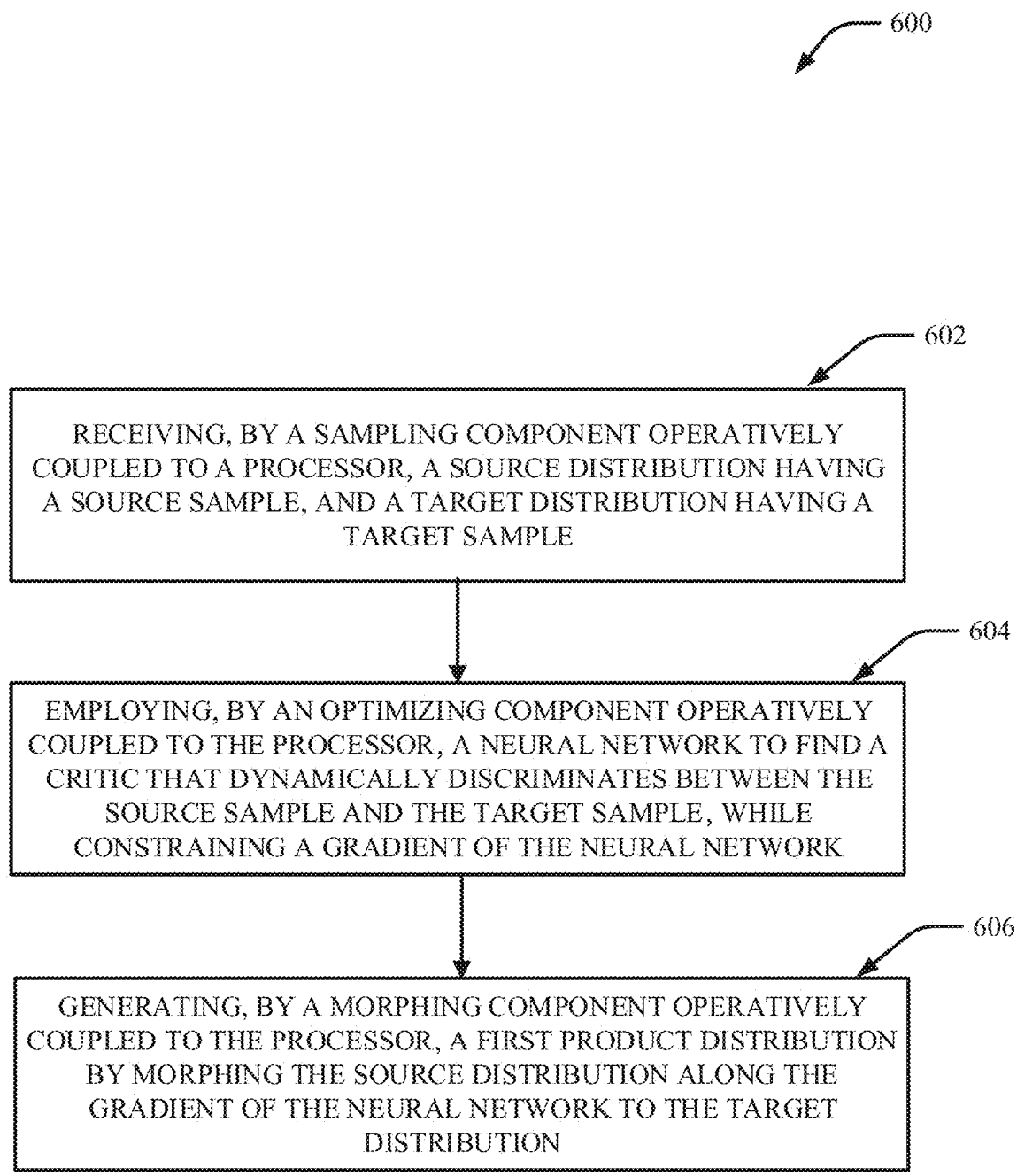
FIG. 6 illustrates a flow diagram of an example, non-limiting computer-implemented method that facilitates transforming source distribution to target distribution using Sobolev Descent in accordance with one or more embodiments described herein.

FIG. 6 illustrates a flow diagram of an example, non-limiting computer-implemented method that facilitates transforming source distribution to target distribution using Sobolev Descent in accordance with one or more embodiments described herein. Repetitive description of like elements employed in other embodiments described herein is omitted for sake of brevity.

In some examples, flow diagram 600 can be implemented by operating environment 1000, described below, or operating environment described by the data transformation system 302. It can be appreciated that the operations of flow diagram 600 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 6. As a non-limiting example, the one or more processors can facilitate performance of the methods by directing or controlling one or more equipment operable to perform semiconductor fabrication.

Operation 602 depicts receiving, by a sampling component 304 (FIG. 3) operatively coupled to a processor 320 (FIG. 3), a source distribution having a source sample, and a target distribution having a target sample. Operation 804 depicts employing, by an optimizer component 406 (FIG. 4) operatively coupled to the processor 320, a neural network to find a critic that dynamically discriminates between the source sample and the target sample, while constraining a gradient of the neural network. Operation 606 depicts generating, by a morphing component 508 (FIG. 5) operatively coupled to the processor 320, a first product distribution by morphing the source distribution along the gradient of the neural network to the target distribution.

Figure 7:
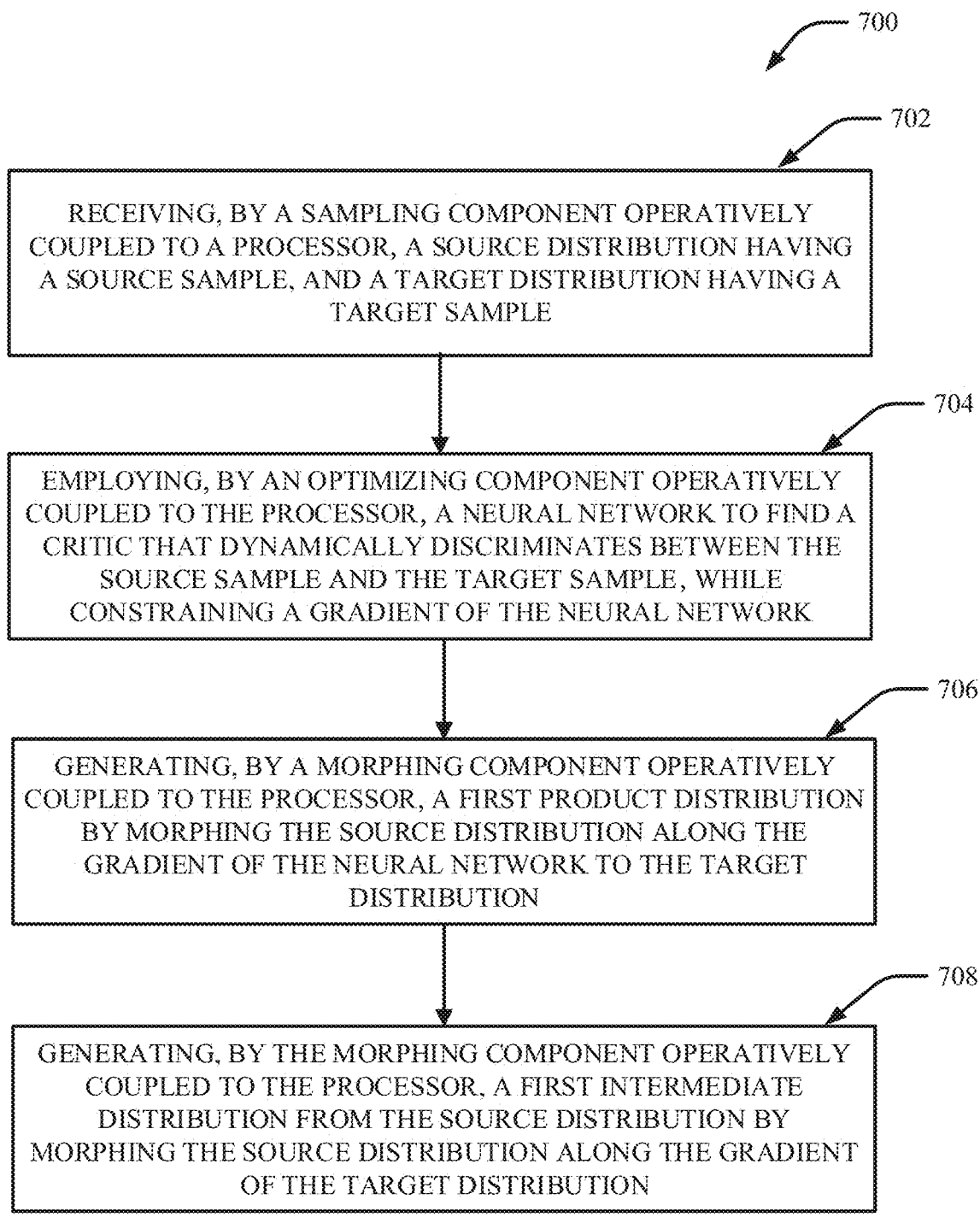
FIG. 7 illustrates a flow diagram of an example, non-limiting computer-implemented method that facilitates transforming source distribution to target distribution using Sobolev Descent in accordance with one or more embodiments described herein.

FIG. 7 illustrates a flow diagram of an example, non-limiting computer-implemented method that facilitates transforming source distribution to target distribution using Sobolev Descent in accordance with one or more embodiments described herein. Repetitive description of like elements employed in other embodiments described herein is omitted for sake of brevity.

In some examples, flow diagram 700 can be implemented by operating environment 1000, described below, or operating environment described by the data transformation system 302. It can be appreciated that the operations of flow diagram 700 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 7. As a non-limiting example, the one or more processors can facilitate performance of the methods by directing or controlling one or more equipment operable to perform semiconductor fabrication.

Operation 702 depicts receiving, by a sampling component 304 (FIG. 3) operatively coupled to a processor 320 (FIG. 3), a source distribution having a source sample, and a target distribution having a target sample. Operation 704 depicts employing, by an optimizer component 406 (FIG. 4) operatively coupled to the processor 320, a neural network to find a critic that dynamically discriminates between the source sample and the target sample, while constraining a gradient of the neural network. Operation 706 depicts generating, by a morphing component 508 (FIG. 5) operatively coupled to the processor 320, a first product distribution by morphing the source distribution along the gradient of the neural network to the target distribution. Operation 708 depicts generating, by a morphing component 508 (FIG. 5) operatively coupled to the processor 320, generating, by the morphing component operatively coupled to the processor, a first intermediate distribution from the source distribution by morphing the source distribution along the gradient of the target distribution.

Figure 8:
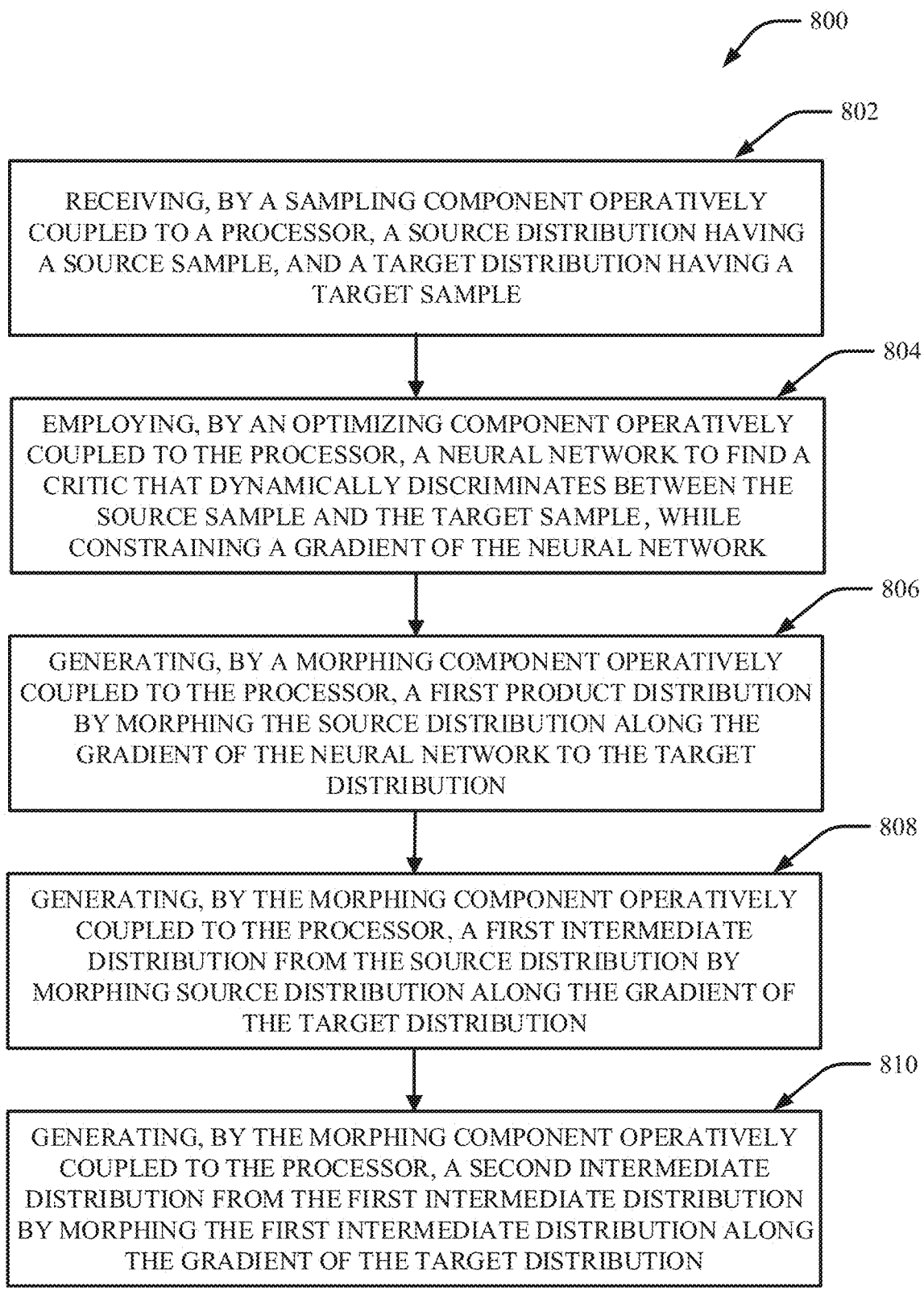
FIG. 8 illustrates a flow diagram of an example, non-limiting computer-implemented method that facilitates transforming source distribution to target distribution using Sobolev Descent in accordance with one or more embodiments described herein.

FIG. 8 illustrates a flow diagram of an example, non-limiting computer-implemented method that facilitates transforming source distribution to target distribution using Sobolev Descent in accordance with one or more embodiments described herein. Repetitive description of like elements employed in other embodiments described herein is omitted for sake of brevity.

In some examples, flow diagram 800 can be implemented by operating environment 1000, described below, or operating environment described by the data transformation system 302. It can be appreciated that the operations of flow diagram 800 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 8. As a non-limiting example, the one or more processors can facilitate performance of the methods by directing or controlling one or more equipment operable to perform semiconductor fabrication.

Operation 802 depicts receiving, by a sampling component 304 (FIG. 3) operatively coupled to a processor 320 (FIG. 3), a source distribution having a source sample, and a target distribution having a target sample. Operation 804 depicts employing, by an optimizer component 406 (FIG. 4) operatively coupled to the processor 320, a neural network to find a critic that dynamically discriminates between the source sample and the target sample, while constraining a gradient of the neural network. Operation 806 depicts generating, by a morphing component 508 (FIG. 5) operatively coupled to the processor 320, a first product distribution by morphing the source distribution along the gradient of the neural network to the target distribution. Operation 808 depicts generating, by a morphing component 508 (FIG. 5) operatively coupled to the processor 320, generating, by the morphing component operatively coupled to the processor, a first intermediate distribution from the source distribution by morphing the source distribution along the gradient of the target distribution. Operation 810 depicts generating, by a morphing component 508 (FIG. 5) operatively coupled to the processor 320, generating, by the morphing component operatively coupled to the processor, a second intermediate distribution from the first intermediate distribution by morphing the first intermediate distribution along the gradient of the target distribution.

Figure 9:
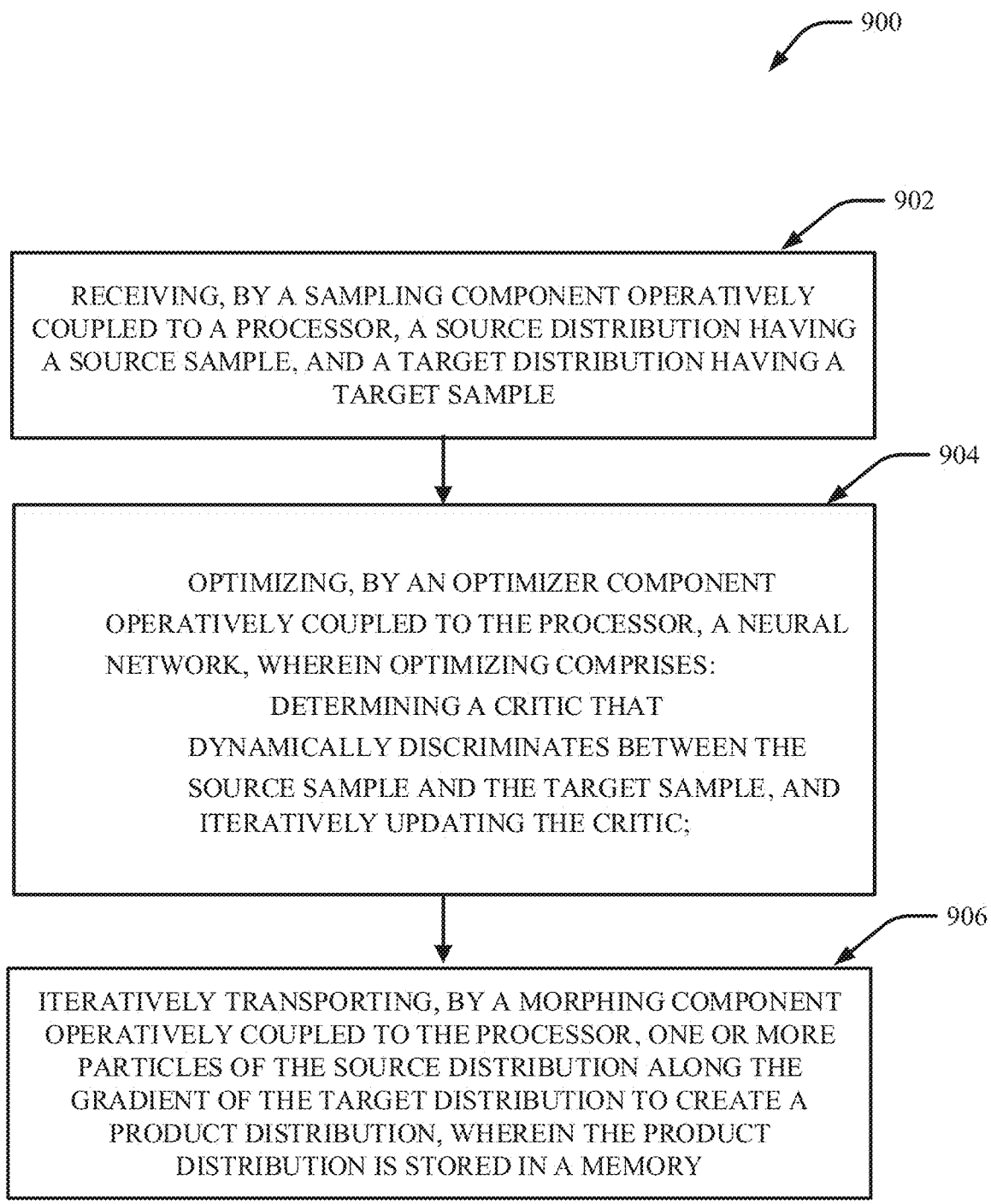
FIG. 9 illustrates a flow diagram of an example, non-limiting computer-implemented method that facilitates transforming source distribution to target distribution using Sobolev Descent in accordance with one or more embodiments described herein.

FIG. 9 illustrates a flow diagram of an example, non-limiting computer-implemented method that facilitates transforming source distribution to target distribution using Sobolev Descent in accordance with one or more embodiments described herein. Repetitive description of like elements employed in other embodiments described herein is omitted for sake of brevity.

In some examples, flow diagram 900 can be implemented by operating environment 1000, described below, or operating environment described by the data transformation system 302. It can be appreciated that the operations of flow diagram 900 can be implemented in a different order than is depicted.

In non-limiting example embodiments, a computing device (or system) (e.g., computer 1012) is provided, the device or system comprising one or more processors and one or more memories that stores executable instructions that, when executed by the one or more processors, can facilitate performance of the operations as described herein, including the non-limiting methods as illustrated in the flow diagrams of FIG. 9. As a non-limiting example, the one or more processors can facilitate performance of the methods by directing or controlling one or more equipment operable to perform semiconductor fabrication. Operation 902 depicts receiving, by a sampling component 304 (FIG. 3) operatively coupled to a processor 320 (FIG. 3), a source distribution having a source sample and a target distribution having a target sample. Operation 904 depicts employing, by an optimizer component 406 (FIG. 4) operatively coupled to the processor 320, a neural network, wherein optimizing comprises: determining a critic that dynamically discriminates between the source sample and the target sample, and iteratively updating the critic. Operation 906 depicts generating, by a morphing component 508 (FIG. 5) operatively coupled to the processor 320, one or more particles of the source distribution along a gradient of the target distribution to create a product distribution that is stored in a memory.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
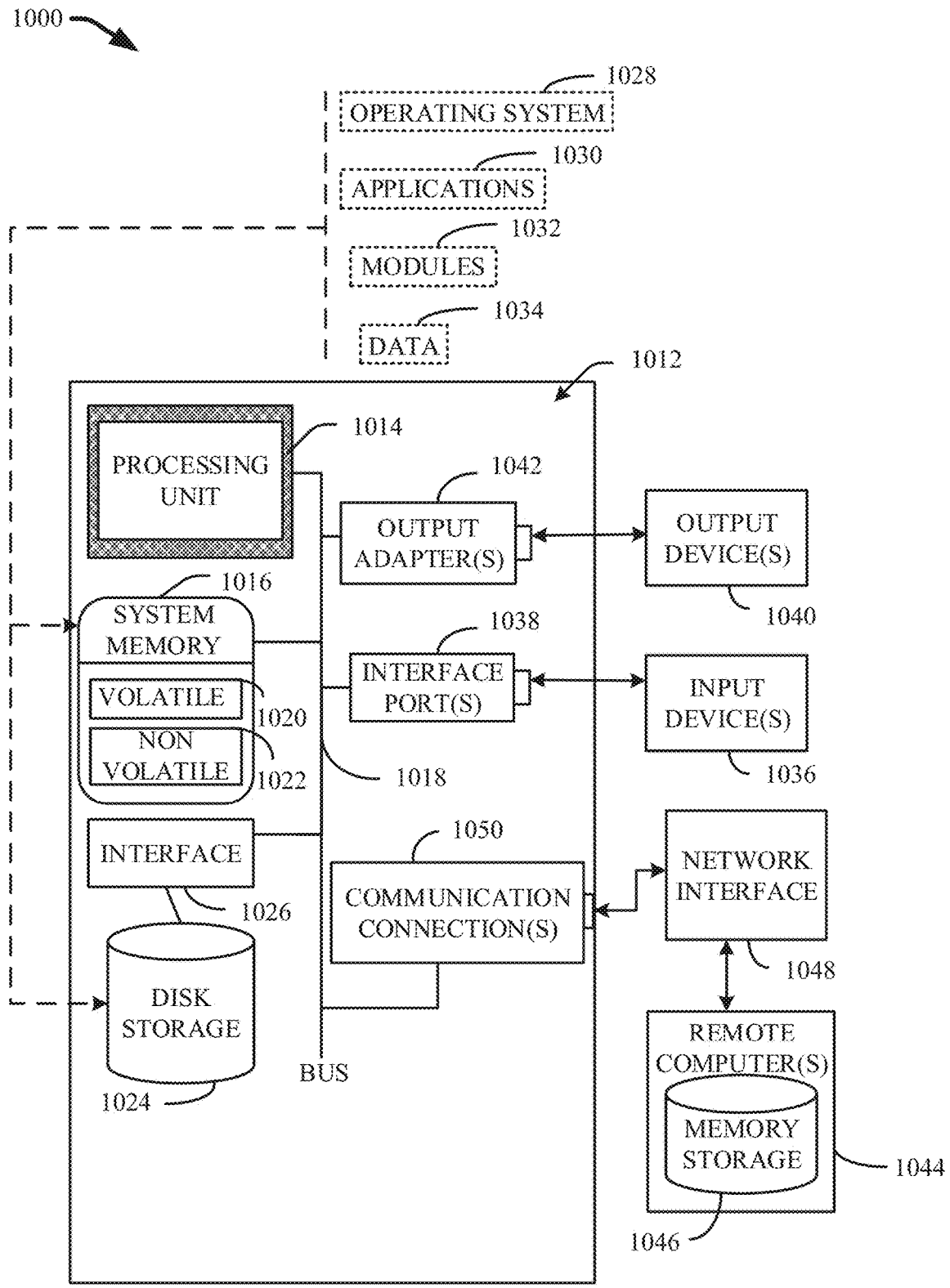
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake, of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes the computer executable components stored in the memory, wherein the computer executable components comprise:
a sampling component that receives a source distribution having a source sample and a target distribution having a target sample;
an optimizer component that employs a neural network to find a critic that dynamically discriminates between the source sample and the target sample, while constraining a gradient of the neural network; and
a morphing component that generates a first product distribution by morphing the source distribution along the gradient of the neural network to the target distribution.

2. The system of claim 1, wherein the first product distribution comprises a color distribution morphed from respective a target color distribution of the target distribution.

3. The system of claim 1, wherein the first product distribution comprises a shape distribution morphed from respective a target shape distribution of the target distribution.

4. The system of claim 1, wherein the neural network comprises a multi-layer perceptron having at least three layers.

5. The system of claim 1, wherein the morphing component generates a first intermediate distribution from the first product distribution by morphing the source distribution along the gradient of the target distribution.

6. The system of claim 5, wherein the morphing component generates a second intermediate distribution from the first intermediate distribution by morphing the first intermediate distribution along the gradient of the target distribution.

7. The system of claim 1, wherein the neural network comprises domain specific architecture.

8. The system of claim 1, wherein the neural network is a convolution neural network for image applications.

9. A computer-implemented method, comprising:
receiving, by a system operatively coupled to a processor, a source distribution having a source sample, and a target distribution having a target sample;
employing, by the system operatively coupled to the processor, a neural network to find a critic that dynamically discriminates between the source sample and the target sample, while constraining a gradient of the neural network; and
generating, by the system operatively coupled to the processor, a first product distribution by morphing the source distribution along the gradient of the neural network to the target distribution.

10. The computer-implemented method of claim 9, wherein the first product distribution comprises a color distribution morphed from respective a target color distribution of the target distribution.

11. The computer-implemented method of claim 9, wherein the first product distribution comprises a shape distribution morphed from respective a target shape distribution of the target distribution.

12. The computer-implemented method of claim 9, wherein the neural network comprises a multi-layer perceptron having three layers.

13. The computer-implemented method of claim 9, further comprising:
generating, by the system operatively coupled to the processor, a first intermediate distribution from the source distribution by morphing the source distribution along the gradient of the target distribution.

14. The computer-implemented method of claim 13, further comprising:
generating, by the system operatively coupled to the processor, a second intermediate distribution from the first intermediate distribution by morphing the first intermediate distribution along the gradient of the target distribution.

15. The computer-implemented method of claim 9, wherein the neural network comprises domain specific architecture.

16. The computer-implemented method of claim 9, wherein the neural network is a convolution neural network for image applications.

17. A computer program product for transforming a source distribution to a target distribution using Sobolev Descent, the computer program product comprising a computer readable storage medium having program instructions embodied therewith, the program instructions executable by a processor to cause the processor to:
receive, by the processor, the source distribution having a source sample and the target distribution having a target sample;
employ, by the processor, a neural network to find a critic that dynamically discriminates between the source sample and the target sample, while constraining a gradient of the neural network; and
generate, by the processor, a first product distribution by morphing the source distribution along the gradient of the neural network to the target distribution.

18. The computer program product of claim 17, wherein the program instructions are further executable by the processor to cause the processor to:
generate, by the processor, a first intermediate distribution from the source distribution by morphing the first product distribution along the gradient of the target distribution.

19. The computer program product of claim 18, wherein the program instructions are further executable by the processor to cause the processor to:
generate, by the processor, a second intermediate distribution from the first intermediate distribution by morphing the first intermediate distribution along the gradient of the target distribution.

20. A system, comprising:
a memory that stores computer executable components;
a processor that executes the computer executable components stored in the memory, wherein the computer executable components comprise:
a sampling component that receives a source distribution having a source sample and a target distribution having a target sample;
an optimizer component that optimizes a neural network, wherein the optimizer component:
determines a critic that dynamically discriminates between the source sample and the target sample,
iteratively optimizes the critic, and
updates one or more parameters of the critic; and
a morphing component that iteratively transports particles of the source distribution along a gradient of the target distribution to create a product distribution, wherein the product distribution is stored in the memory.

21. The system of claim 20, wherein the source distribution comprises a first image and the target distribution comprise a second image.

22. The system of claim 20, wherein the neural network comprises a multi-layer perceptron having at least three layers.

23. A computer-implemented method, comprising:
  receiving, by a sampling component operatively coupled to a processor, a source distribution having a source sample and a target distribution having a target sample;
  optimizing, by an optimizer component operatively coupled to the processor, a neural network, wherein optimizing comprises:
    determining a critic that dynamically discriminates between the source sample and the target sample, and
    iteratively updating the critic; and
  iteratively transporting, by a morphing component operatively coupled to the processor, one or more particles of the source distribution along a gradient of the target distribution to create a product distribution that is stored in a memory.

24. The computer-implemented method of claim 23, wherein the source distribution comprises a first image and the target distribution comprise a second image.

25. The computer-implemented method of claim 23, wherein the neural network comprises a multi-layer perceptron having at least three layers.

* * * * *